(12) United States Patent
Yavid

(10) Patent No.: US 7,665,853 B2
(45) Date of Patent: Feb. 23, 2010

(54) ARRANGEMENT FOR, AND METHOD OF, ENHANCING IMAGE PROJECTION BY HOLDING SCAN MIRROR STEADY DURING PART OF MIRROR DRIVE CYCLE

(75) Inventor: Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 282 days.

(21) Appl. No.: 11/446,754

(22) Filed: Jun. 5, 2006

(65) Prior Publication Data

US 2007/0285629 A1    Dec. 13, 2007

(51) Int. Cl.
*G03B 23/00*    (2006.01)
*G03B 21/00*    (2006.01)

(52) U.S. Cl. ........................................ 353/98; 353/121

(58) Field of Classification Search ................. 353/122, 353/121, 28, 30, 94, 98, 99, 31, 37; 348/800–803; 349/69; 362/553, 559–561; G03B 21/28
See application file for complete search history.

(56) References Cited

U.S. PATENT DOCUMENTS

| | | | | |
|---|---|---|---|---|
| 5,614,961 | A * | 3/1997 | Gibeau et al. ............... 348/750 |
| 7,059,523 | B1 * | 6/2006 | Yavid ......................... 235/454 |
| 7,325,929 | B2 * | 2/2008 | Yavid et al. ................... 353/31 |
| 7,352,499 | B2 * | 4/2008 | Yavid et al. ................. 359/198 |
| 7,367,682 | B2 * | 5/2008 | Dvorkis et al. ............... 353/101 |
| 2003/0039036 | A1 * | 2/2003 | Kruschwitz et al. ......... 359/707 |
| 2004/0136204 | A1 * | 7/2004 | Asao ........................... 362/561 |
| 2006/0087628 | A1 * | 4/2006 | Dvorkis et al. ............... 353/121 |
| 2006/0255243 | A1 * | 11/2006 | Kobayashi et al. ........ 250/208.1 |

* cited by examiner

*Primary Examiner*—Hung Henry Nguyen
(74) *Attorney, Agent, or Firm*—Kirschstein, et al.

(57) ABSTRACT

A scan mirror is held steady during a holding period interval between forward and return scans in a lightweight, compact image projection module operative for causing selected pixels in a raster pattern to be illuminated to project an image in color.

25 Claims, 9 Drawing Sheets

FIG. 7 CON'T

ARRANGEMENT FOR, AND METHOD OF, ENHANCING IMAGE PROJECTION BY HOLDING SCAN MIRROR STEADY DURING PART OF MIRROR DRIVE CYCLE

BACKGROUND OF THE INVENTION

1. Field of the Invention

The present invention generally relates to an arrangement for, and a method of, enhancing image projection, especially for use in a color image projection system.

2. Description of the Related Art

It is generally known to project a two-dimensional image on a projection surface based on a pair of scan mirrors which oscillate by respective drives in mutually orthogonal directions to scan a laser beam over a raster pattern. One of the scan mirrors, sometimes referred to herein as an X-mirror, is driven at a faster rate to reflect the laser beam along a scan direction and generate a scan line. The other of the scan mirrors, sometimes referred to herein as a Y-mirror, is driven at a slower rate to reflect the scan line along a transverse direction perpendicular to the scan direction. The drive for the Y-mirror oscillates the Y-mirror in one direction about an axis at a constant drive speed during a forward scan, that is from an upper scan line to a lower scan line of the raster pattern, or vice versa. The drive for the Y-mirror does not drive the Y-mirror in the opposite direction about the axis during a return scan, that is from the lower scan line to the upper scan line of the raster pattern. Instead, the Y-mirror is self-returnable at a mechanical resonant frequency during the return scan, sometimes referred to herein as a drive-unassisted flyback.

Although generally satisfactory for their intended purpose, the images projected by the known image projectors could be enhanced. Sometimes a drive cycle of the Y-mirror, that is the total duration of the forward scan and the return scan, does not exactly equal a frame rate or period of an incoming video signal. The video signal can have a variable or an unstable frame rate, and a lack of synchronization between the video signal and the Y-mirror drive signal can lead to distorted images.

Another problem with known image projectors is that the lasers, which emit the laser beams, have a non-linear modulation function which can also change with temperature, age and other factors. Such lasers need to be calibrated because the image projectors require a linear and stable relationship between laser output power and the incoming video signal.

Yet another problem with known image projectors is that the Y-mirror deviates from its ideal speed profile over time. Such speed deviation needs to be corrected to insure that the projected image is of high quality.

SUMMARY OF THE INVENTION

Objects of the Invention

Accordingly, it is a general object of this invention to provide an arrangement for, and a method of, enhancing image projection, especially for use in an image projection system that projects a two-dimensional color image.

Another object is to provide a miniature, compact, lightweight, energy-efficient, and portable color image projection module useful in many instruments of different form factors, especially hand-held instruments.

Features of the Invention

In keeping with these objects and others, which will become apparent hereinafter, one feature of this invention resides, briefly stated, in an arrangement for, and a method of, enhancing image projection, as detailed below. A light source, for example, a single laser, is operative for generating a laser beam for creating a monochromatic image. For a color image, the light source includes a plurality of lasers of different wavelengths (e.g., red, blue and green) whose respective laser beams are collinearly arranged as a composite laser beam.

A mirror assembly is operative for reflecting the laser beam as a pattern of scan lines on a projection surface, such as a screen, each scan line having a number of pixels. The mirror assembly preferably includes a pair of scan mirrors oscillatable about mutually orthogonal axes to form a raster pattern.

A drive assembly is operative for oscillating one of the scan mirrors, sometimes referred to herein as an X-mirror, at a faster rate to reflect the laser beam along a scan direction to generate a scan line. The drive assembly is also operative for oscillating the other of the scan mirrors, sometimes referred to herein as a Y-mirror, at a slower rate to reflect the scan line along a transverse direction perpendicular to the scan direction. The Y-mirror is preferably driven in one direction about an axis at a constant drive speed at a drive frequency during a forward scan, that is from an upper scan line to a lower scan line of the raster pattern, or vice versa. Typically, a video frame rate of 60 Hz or 85 Hz is common, but other frame rates in common use are 56 Hz, 72 Hz and 75 Hz. The Y-mirror may or may not be driven in the opposite direction about the axis during a return scan, that is from the lower scan line to the upper scan line of the raster pattern.

A controller, preferably a programmed microprocessor, is operative for causing selected pixels in the scan lines to be illuminated, and rendered visible, by the laser beam to form the image on the projection surface during the forward scan of the pattern, and for non-illuminating the pixels in the scan lines during the return scan of the pattern.

In some applications, the Y-mirror is self-returnable at a mechanical resonant frequency during the return scan, sometimes referred to herein as a drive-unassisted flyback. In other applications, the Y-mirror is driven during the return scan with a first drive pulse of one polarity during a first interval of the flyback, and with a second drive pulse of opposite polarity during a subsequent, second interval of the flyback. The first drive pulse enables the Y-mirror to reach a speed higher than it would under a drive-unassisted flyback. The second drive pulse brakes the Y-mirror and forces it to stop in a shorter or reduced time period. During a drive-assisted flyback, the brightness of the projected image is increased on the order of 5-10% since the lasers, which are typically turned off during the return scan, are maintained off for a shorter time period than heretofore.

In the preferred embodiment, an electromagnetic drive oscillates the Y-mirror, which is mounted on a taut flexure which, in turn, is mounted on a support. The flexure has a pair of torsion portions extending along the axis. The flexure is flexed by magnetic field interaction. A permanent magnet is mounted on the flexure between the torsion portions, and an electromagnetic coil is mounted on the support. In response to a periodic drive signal applied to the coil, a periodic electromagnetic field is produced which interacts with a permanent magnetic field of the magnet.

During the forward scan, the periodic drive signal is a linear voltage signal, which causes the flexure, the magnet, and the Y-mirror to move at a constant speed in one circumferential direction. During a drive-assisted return scan, the drive signal includes the first drive pulse which causes the flexure, the magnet, and the Y-mirror to initially move at a higher speed, and the second inverse drive pulse which causes the flexure, the magnet, and the Y-mirror to move in an opposite circumferential direction and subsequently stop in a shorter return time.

In accordance with this invention, the Y-mirror is held substantially steady, that is substantially stationary or nearly so, during a holding period interval between the forward scan and the return scan. The drive is operative for driving the Y-mirror at a substantially zero drive speed during the holding period interval. This is preferably accomplished by applying a constant voltage to the electromagnetic coil. To bring the Y-mirror back up to speed, the drive is also operative for driving the Y-mirror with an acceleration pulse applied to the electromagnetic coil during an acceleration interval between the forward scan and the return scan to move the Y-mirror from the substantially zero drive speed to the substantially constant drive speed.

The holding period interval during which the Y-mirror is steady is useful for many purposes. The holding period interval may have an adjustable time duration. The total duration of the Y-mirror drive cycle, that is, the total durations of the return scan, the holding period interval, the acceleration period interval, and the forward scan, can be made to exactly equal the frame rate of the incoming video signal. The holding period interval can also be conveniently used for calibrating the lasers, or for collecting feedback on the deviation of the Y-mirror from its ideal speed profile and for taking corrective action.

The support, lasers, mirror assembly, and controller preferably occupy a volume of less than thirty cubic centimeters, thereby constituting a compact module, which is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
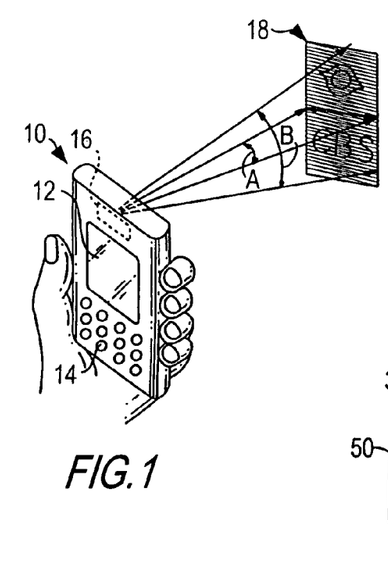
FIG. 1 is a perspective view of a hand-held instrument projecting an image at a working distance therefrom.
Figure 2:
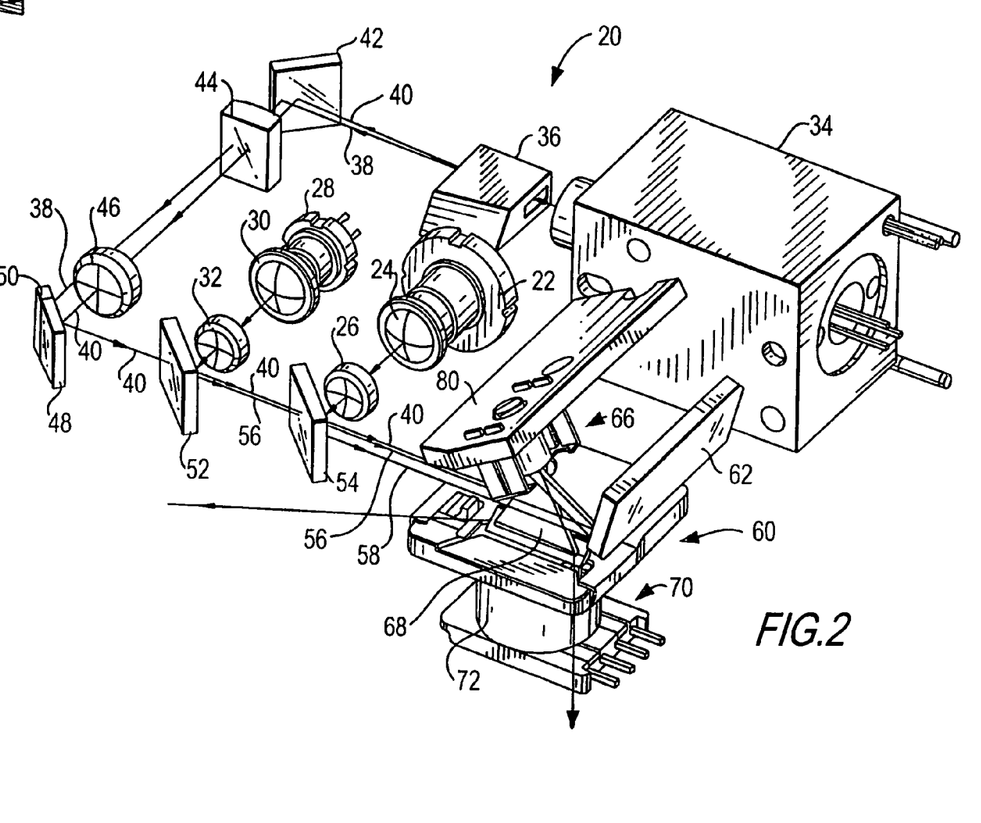
FIG. 2 is an enlarged, overhead, perspective view of an image projection system for installation in the instrument of FIG. 1.

Reference numeral 10 in FIG. 1 generally identifies a hand-held instrument, for example, a personal digital assistant, in which a lightweight, compact, image projection module or arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Figure 3:
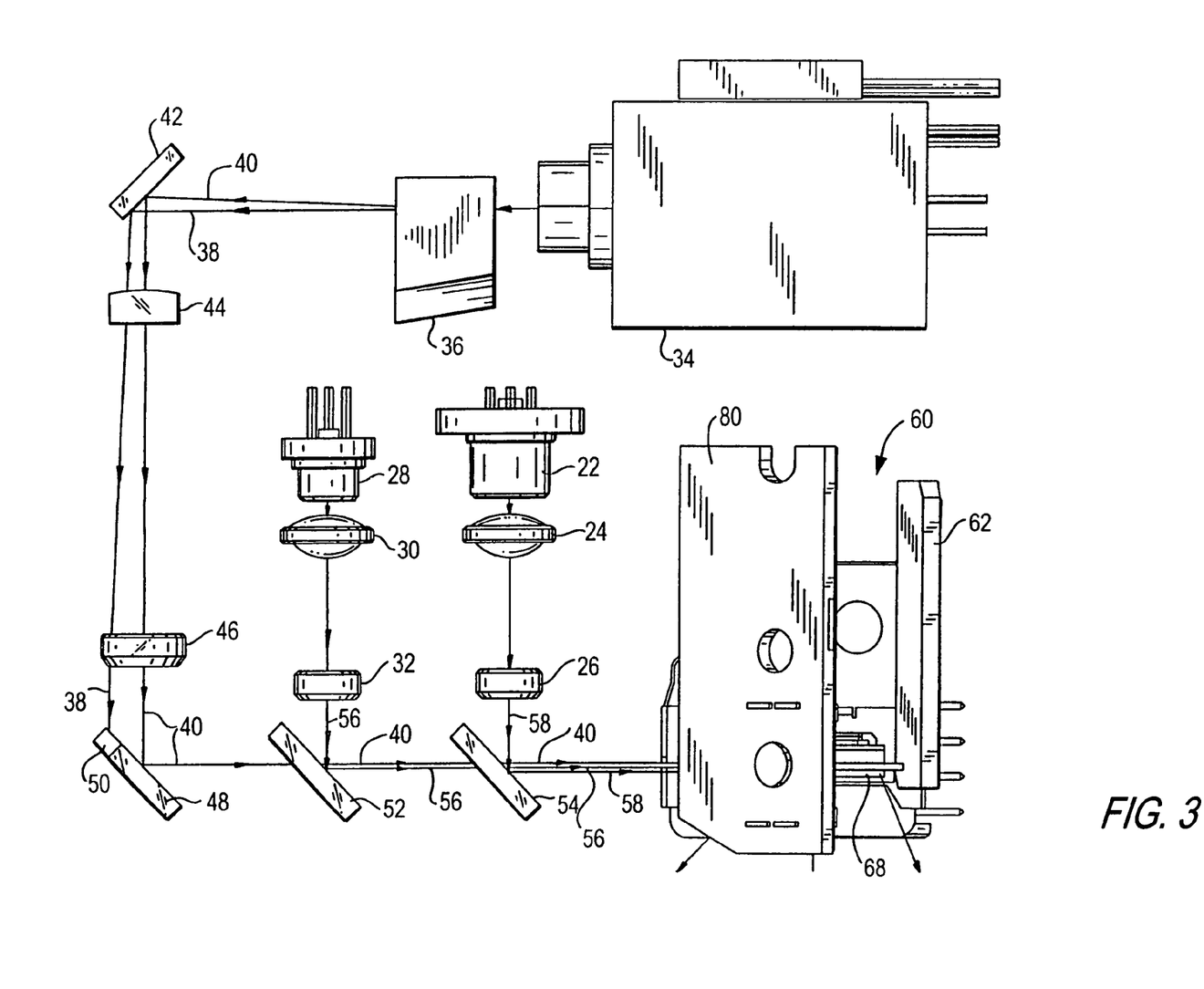
FIG. 3 is a top plan view of the system of FIG. 2.

Referring to FIGS. 2 and 3, the arrangement 20 includes a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 430-480 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between two laser mirrors. Since the infrared laser power inside the cavity is much larger than the power coupled outside the cavity, the frequency doubler is more efficient in generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device such as a thermo-electric cooler relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to the controller, which adjusts the control current to the thermoelectric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36, which creates an acoustic traveling wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or a Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as collinear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

The nearly collinear beams 40, 56, 58 are directed to, and reflected off, a stationary fold mirror 62. The scanning assembly 60 includes a first scan mirror 64, sometimes referred to herein as an X-mirror, oscillatable by an inertial drive 66 (shown in isolation in FIGS. 4-5), sometimes referred to herein as an X-drive, at a first scan rate to sweep the laser beams reflected off the fold mirror 62 over the first horizontal scan angle A, and a second scan mirror 68, sometimes referred to herein as a Y-mirror, oscillatable by an electromagnetic drive 70, sometimes referred to herein as a Y-drive, at a second scan rate to sweep the laser beams reflected off the first scan mirror 64 over the second vertical scan angle B. In a variant construction, the scan mirrors 64, 68 can be replaced by a single two-axis mirror.

Figure 4:
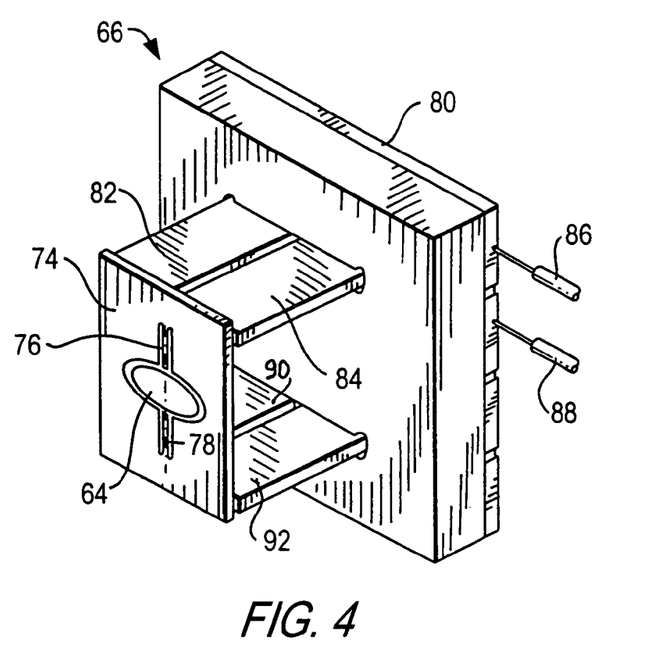
FIG. 4 is a perspective front view of an inertial drive for use in the system of FIG. 2.
Figure 5:
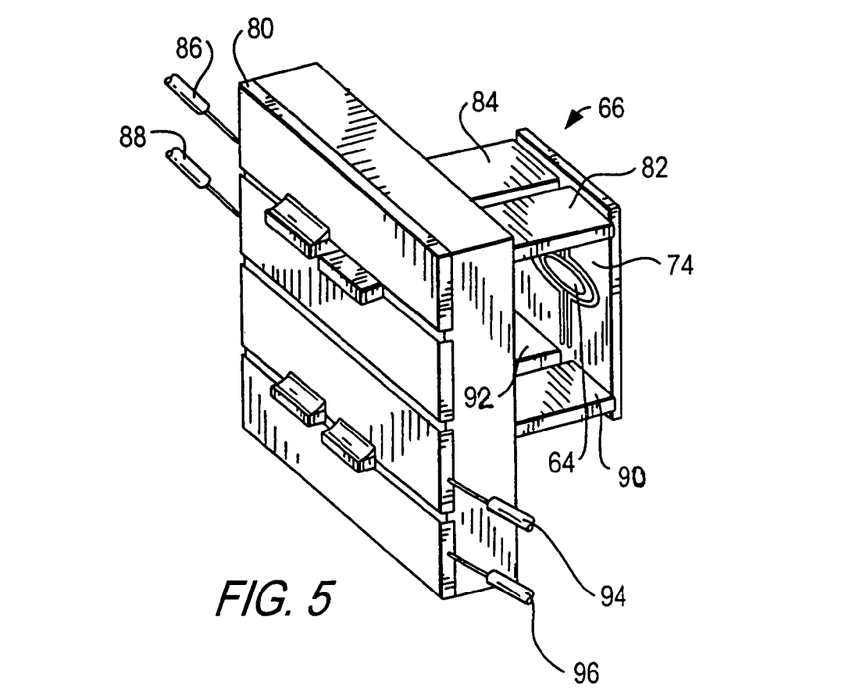
FIG. 5 is a perspective rear view of the inertial drive of FIG. 4.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate, which is approximately 150 microns thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measures 749 microns×1600 microns. Each hinge portion measures 27 microns in width and 1130 microns in length. The frame has a rectangular shape measuring 3100 microns in width and 4600 microns in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150 microns thick, and the scan mirror has a high Q factor. A movement on the order of 1 micron by each transducer can cause oscillation of the scan mirror at scan angles in excess of 15 degrees.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 (shown in exploded view in FIG. 8 and in assembled view in FIG. 9) includes a permanent magnet 71 jointly mounted on a flexure 200 and behind the second scan mirror 68, and an electromagnetic coil 72 operative for generating a periodic magnetic field in response to receiving a periodic drive signal. The coil 72 is adjacent to the magnet 71 so that the periodic field magnetically interacts with the permanent field of the magnet and causes the magnet and, in turn, the second scan mirror 68 to oscillate, as described in detail below.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate, which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720p, 1270×720 pixels, can be displayed. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror 68 is operated in a constant velocity sweep-mode, as described below in connection with FIG. 10C, during a drive-assisted forward scan in which time the image is displayed. During a drive-assisted return scan of the slow-mirror 68, the slow-mirror 68 is driven back to its initial position during a reduced time period. During the mirror's return trip, the lasers can be powered down in order to reduce the power consumption of the arrangement. Since the lasers are turned off for a shorter time during the return scan, the projected image is brighter.

Figure 6:
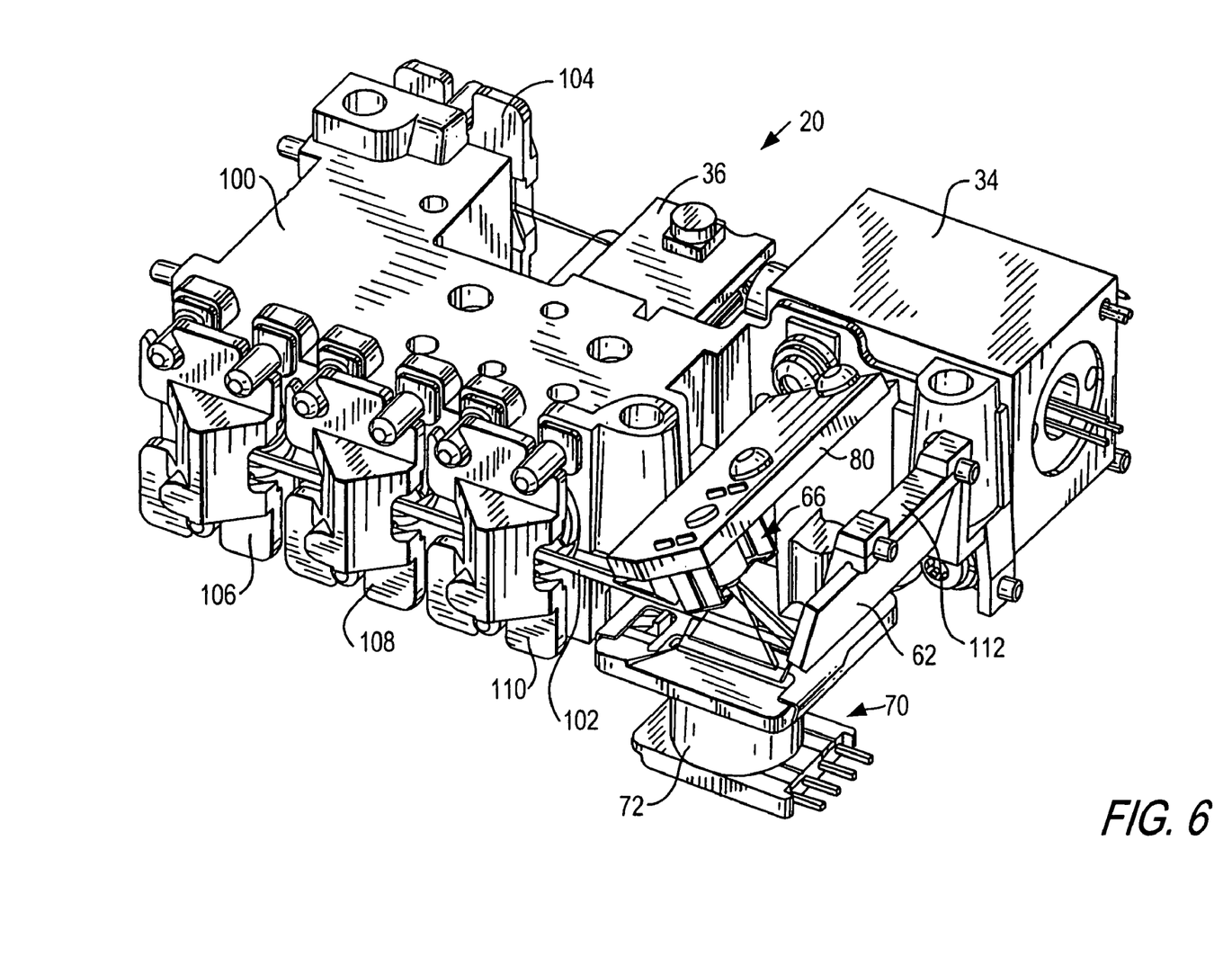
FIG. 6 is a perspective view of a practical implementation of the system of FIG. 2.

FIG. 6 is a practical implementation of the arrangement 20 in the same perspective as that of FIG. 2. The aforementioned components are mounted on a support, which includes a top cover 100 and a support plate 102. Holders 104, 106, 108, 110, 112 respectively hold folding mirrors 42, 48, filters 52, 54 and fold mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the X-drive along the horizontal direction at the horizontal scan rate to an opposite end point to form a scan line. Thereupon, the laser beams are swept by the Y-drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
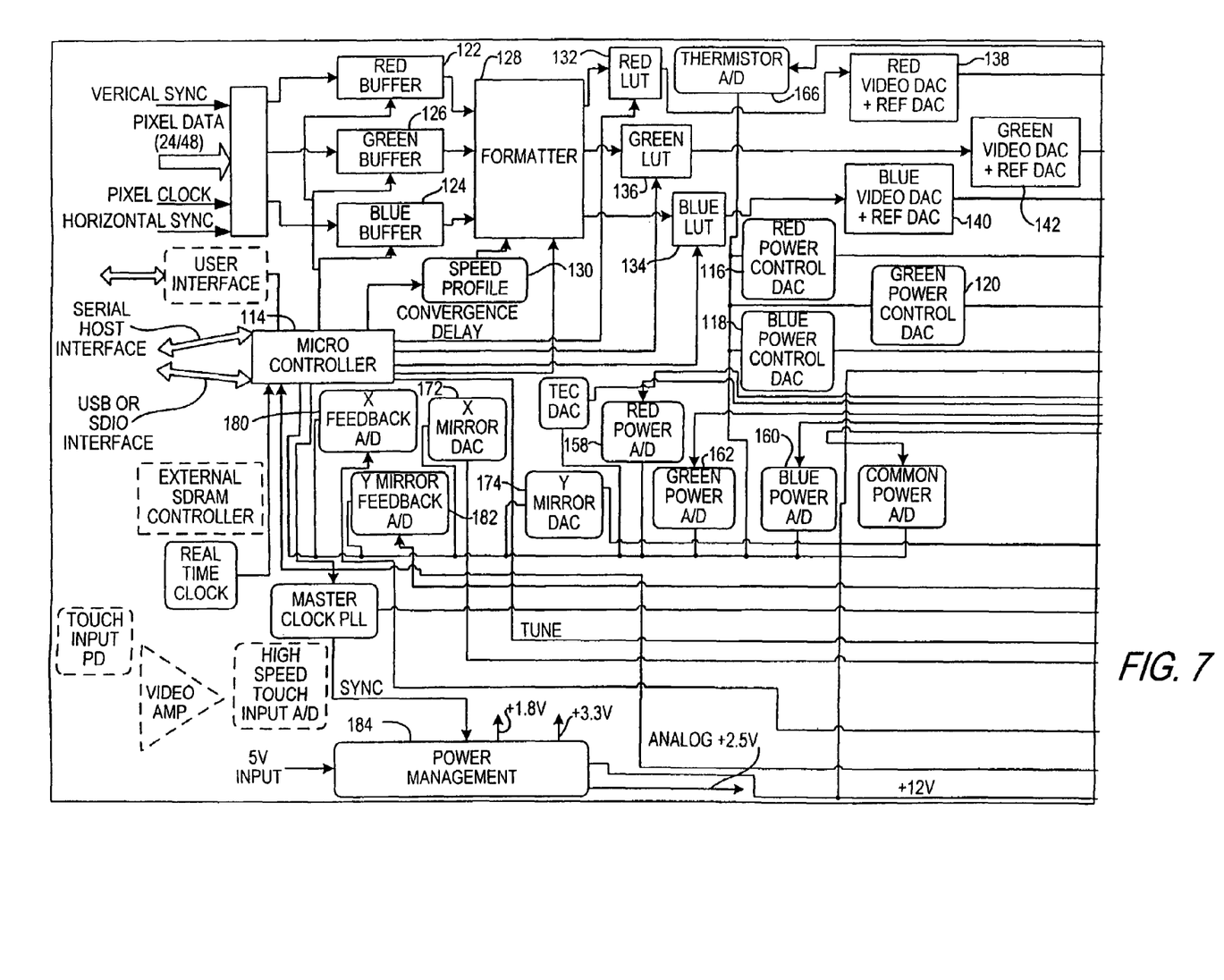
FIG. 7 is an electrical schematic block diagram depicting operation of the system of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
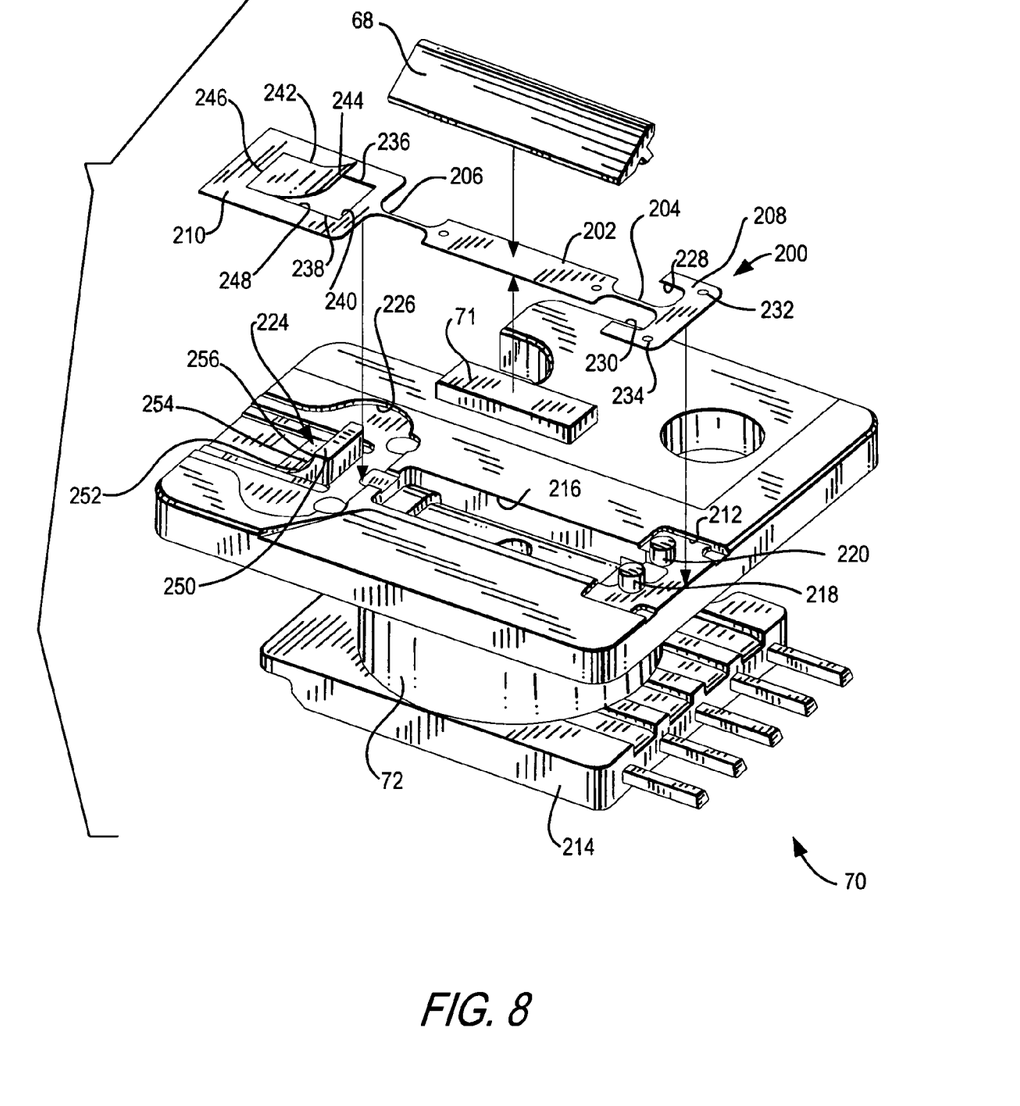
FIG. 8 is an exploded view of a compact drive in accordance with this invention as used in the system of FIG. 6.
Figure 9:
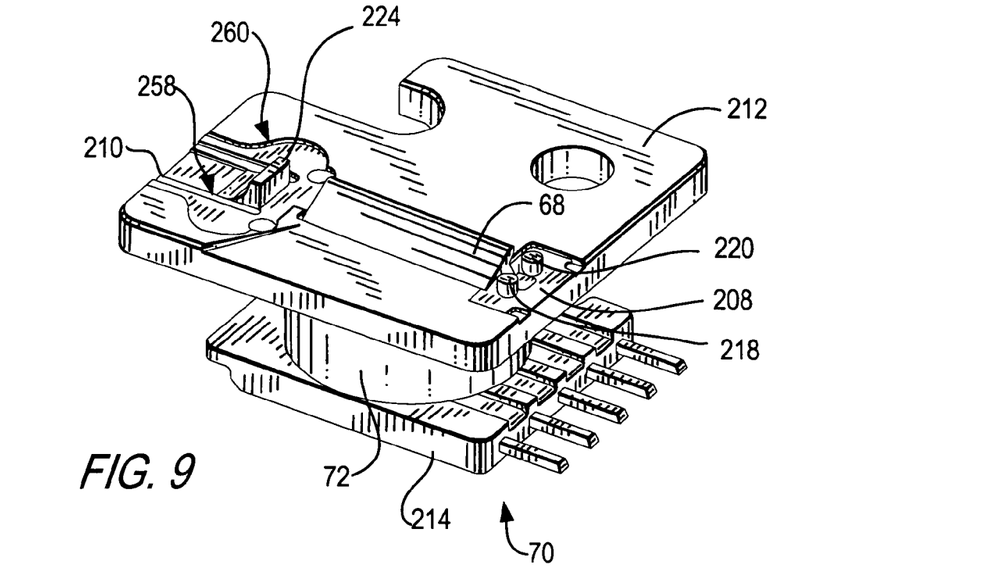
FIG. 9 is an assembled view of the drive of FIG. 8.

Turning now to the Y-drive 70 of FIGS. 8-9, the above-described flexure 200 includes a planar support portion 202, a pair of planar collinear torsion portions 204, 206, and a pair of planar end portions 208, 210. The flexure is a single elongated piece of resilient material, preferably a tempered stainless steel having a thickness on the order of 0.027 mm. The width of the torsion portions is on the order of 0.122 mm and, although it is possible to machine the flexure with such dimensions, it is preferable to chemically etch the flexure for this purpose. The torsion portions are thin, long, wire-like strands, which behave as torsion bars, as described below.

The Y-drive 70 includes a molded plastic support having an upper plate 212 and a lower plate 214 between which the coil 72 is sandwiched. The upper plate has an elongated recessed compartment 216 having a top opening, a pair of upright, cylindrical positioning pins 218, 220 mounted in a shallow generally rectangular recess 222, and an upright projection 224 mounted in another shallow recess 226.

The flexure 200 is mounted on the upper plate 212 and longitudinally spans the top opening of the compartment 216. The magnet 71 is mounted on the bottom side of the support portion 202 and lies at least partly within the compartment 216, thereby positioning the magnet 71 closer to the coil than heretofore, and shortening the overall vertical height required for the drive.

The end region 208 is E-shaped and has a pair of cutouts 228, 230 for snugly receiving the pins 220, 218. Inlet holes 232, 234 permit the introduction of a liquid glue to securely anchor the end region 208 in the shallow recess 222.

The end region 210 is shaped as a rectangle and is interiorly formed with two longitudinal cuts 236, 238 and a transverse cut 240, thereby framing and creating a rectangular flap 242. The flap 242 lies in the same plane as the end region 210. For purposes of clarity of illustration, however, the flap 242 in FIG. 8 has been shown in its curved, compressed or buckled state, in order to better display its free edge 244 which is above the plane of the end region 210 in the taut state. The flap 242 is hinged to the end region 210 at its hinged edge 246, which is parallel to the free edge 244.

When the end region 210 is mounted on the upper plate 212, a top surface 250 of the aforementioned projection 224 engages the underside of the flap 242 adjacent the free edge 244 and pushes the flap to assume the illustrated curved shape. As the flap is bent, it vacates a rectangular cutout 248 in the end region 210. The projection 224 also has a curved surface 252, which is generally of complementary contour to the curvature of the bent flap 242. Actually, the curved surface 252 is designed to insure that the bent flap 242 is not bent past its yield point during assembly, even if the flexure is manually installed with the aid of a tool such as tweezers. In other words, it is not desired to impart a permanent bend to the flap since such a permanent deformation could rob the flap of providing the necessary tension to the flexure as described below. In addition, a limited clearance between the curved surface 252 and the curved flap 242 ensures that a permanent bend will not be imparted to the flap in case of a drop event, that is, where the arrangement experiences sudden shock and deceleration forces when it accidentally hits the ground or other hard surface.

Once the end region 210 is placed flat on the upper plate 212, as shown in FIG. 9, the free edge 244 is captured with a snap-type action in a corner 254 formed between an upright vertical surface 256 and the curved surface 252 of the projection 250. The projection 224 cooperates with the resilient flap 242 to apply tension lengthwise of the flexure, that is, the end region 210 is pushed away from the end region 208. This tension is achieved by the flap, which is integral with the flexure. It is the compression or buckling of the flap that creates a reaction force to tension the torsion portions of the flexure.

During energization of the coil 72 with a periodic drive signal, a periodic electromagnetic field is propagated which interacts with the permanent field of the magnet 71, thereby causing the magnet to move in one circumferential direction along an axis along which the torsion portions 204, 206 extend. The magnet moves the support portion 202 and the scan mirror 68 and twists the torsion portions 204, 206 in one circumferential direction about the axis relative to the fixed end portions 208, 210 to an end-limiting scan position. Thereupon, the coil 72 is again energized, as described below, thereby moving the magnet 71, the support portion 202 and the scan mirror 68, as well as twisting the torsion portions, in the opposite circumferential direction about the axis relative to the fixed end portions 208, 210, to another end-limiting scan position. This cycle is repeated, thereby oscillating the scan mirror 68 and sweeping any light beam incident on the scan mirror 68 between the end-limiting scan positions.

A pair of vibration dampers 258, 260 is adhered on the end region 210 and the upper plate 212. The dampers serve as visco-elastic dampers designed to attenuate any vibrations in a certain frequency range. The dampers also serve as an additional mechanical anchorage for the end region 210 to resist the flexure becoming dislodged from the projection 224 during a drop event.

Figure 10A:
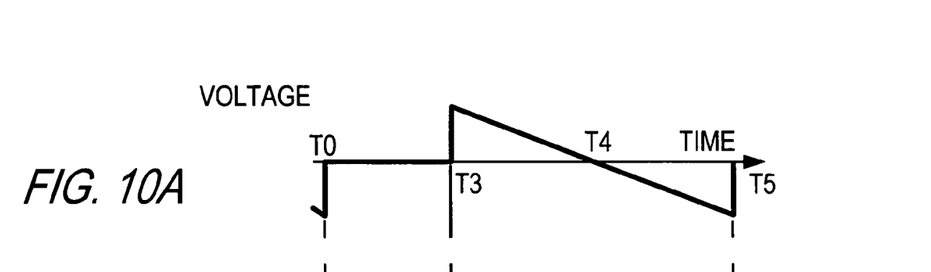
FIG. 10A is a graph depicting voltage versus time for the Y-drive of FIGS. 8-9 during the forward and return scans.

As graphically depicted in FIG. 1A, the scan mirror 68 may be driven by a linear drive voltage at a drive frequency between times T3 and T5 in a forward scan at a substantially constant drive speed (see solid horizontal line in FIG. 10C) during a part of the drive cycle by the electromagnetic drive 70 during which time one frame of the image is displayed. A non-distorted image requires the velocity to be substantially constant during the forward scan. This forward scan represents the movement of the scan line from its uppermost position to its lowermost position in the raster pattern, or vice versa. As previously mentioned by way of numerical example, a typical drive frequency, i.e., frame rate, is 60 Hz or 85 Hz, but other drive frequencies, such as 56 Hz, 72 Hz and 75 Hz, are also often used.

Figure 10B:
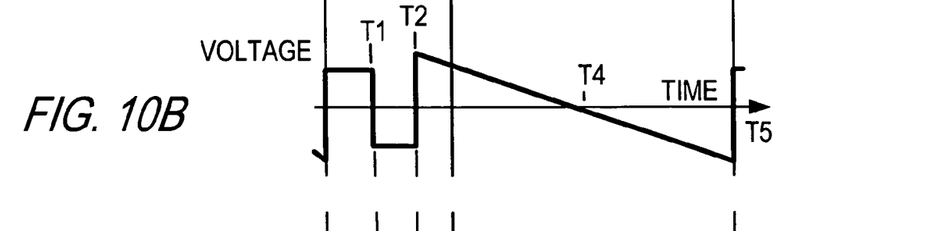
FIG. 10B is a graph depicting voltage versus time for the Y-drive of FIGS. 8-9 during the forward and return scans.
Figure 10C:
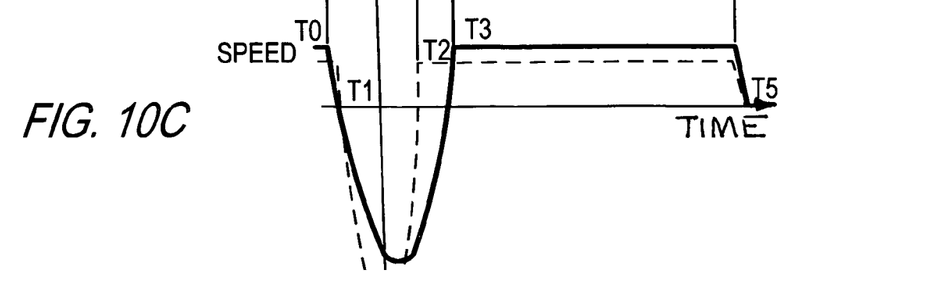
FIG. 10C is a pair of graphs comparing speed versus time in solid lines for the Y-mirror of FIG. 10A and in dashed lines for the Y-mirror of FIG. 10B.

FIG. 10A also depicts a drive-unassisted, Y-mirror return scan in which the scan mirror 68 returns between times T0 and T3 during the remaining part of the drive cycle at a variable speed (see solid sinusoidal line in FIG. 10C). This represents the return movement or flyback of the scan line from its lowermost position to its uppermost position in the raster pattern, or vice versa. The return is performed at the mechanical resonant frequency of the scan mirror 68; for example, the resonant frequency may be selected to be in a range from 270-280 Hz.

As graphically shown in FIG. 10B, the Y-mirror 68 may alternatively be driven by a positive pulse between times T0 and T1 during an initial part of the return scan, and by a negative pulse between times T1 and T2 during a subsequent part of the return scan. The first positive drive pulse enables the Y-mirror 68 to reach a speed higher than it would under a drive-unassisted flyback (see dashed sinusoidal line at T1 in FIG. 10C). The second negative drive pulse brakes the Y-mirror 68 and forces it to stop in a shorter or reduced time period (see dashed sinusoidal line at T2 in FIG. 10C). In the preferred embodiment, the duration of a drive cycle is from about 12 to 16 milliseconds; the forward scan has a duration of from about 10 to 14 milliseconds; and the return scan has a duration of about 2 milliseconds. Each of the drive pulses has a duration of from about ½ to about ¾ milliseconds.

When a drive-assisted flyback is used, the time period for the flyback is reduced. This can be observed in FIG. 10C wherein the duration between times T0 and T2 is less than the duration between times T0 and T3. The brightness of the projected image is increased for the drive-assisted flyback on the order of 5-10% since the lasers, which are typically turned off during the flyback, are maintained off for a shorter time period than heretofore.

It will also be observed in FIG. 10C that the time period for the forward scan is increased. The duration between times T2 and T5 is more than the duration between times T3 and T5. This additional time was obtained from the savings in time from the drive-assisted flyback. This additional time is advantageous because it enables a non-distorted image to be more accurately drawn over a longer time during the forward scan.

In accordance with this invention, the Y-mirror 68 is held substantially steady, that is substantially stationary or nearly so, during a holding period interval (see the duration between times T6 and T7 in FIG. 11A or FIG. 11B) between the forward scan (see the duration between times T3 and T5) and the return scan (see the duration between times T0 and T1). The Y-drive is operative for driving the Y-mirror 68 at a substantially zero drive speed (see the duration between times T6 and T7 in FIG. 11B) during the holding period interval. This is preferably accomplished by applying a constant voltage (see the duration between times T6 and T7 in FIG. 11A) to the electromagnetic coil 70. To bring the Y-mirror 68 back up to speed, the drive is also operative for driving the Y-mirror with an acceleration pulse (see the duration between times T7 and T3 in FIG. 11A) applied to the electromagnetic coil during an acceleration interval (see the duration between times T7 and T3 in FIG. 11B) between the forward scan and the return scan to move the Y-mirror from the substantially zero drive speed to the substantially constant drive speed.

Figure 11A:
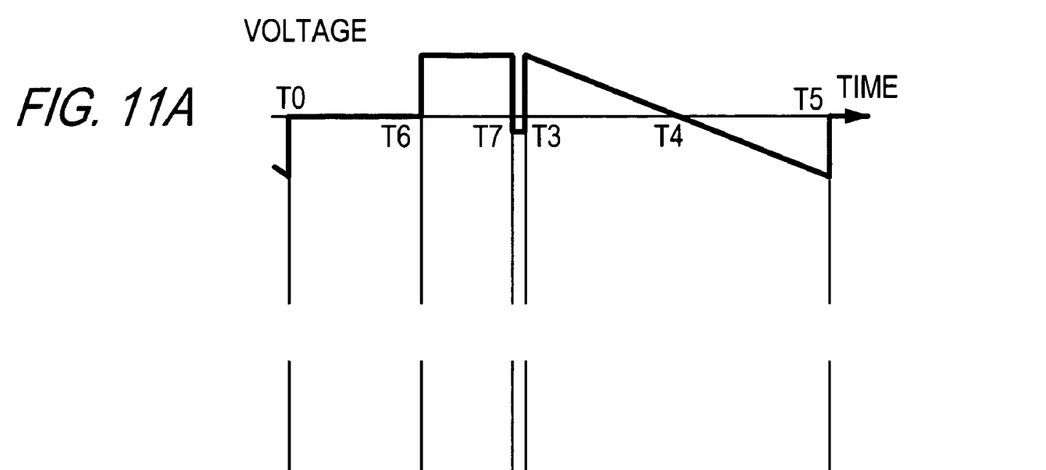
FIG. 11A is a graph depicting voltage versus time for the Y-drive of FIGS. 8-9 during a drive cycle which includes the forward and return scans of FIG. 10A, as well as holding and acceleration period intervals between the forward and the return scans, in accordance with this invention.
Figure 11B:
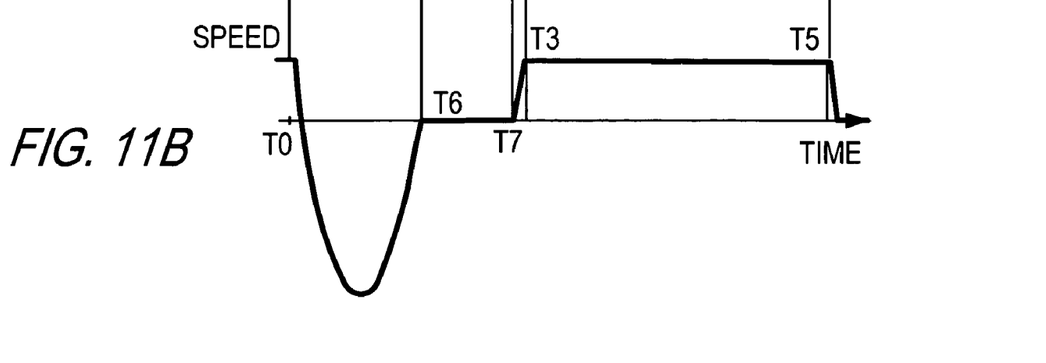
FIG. 11B is a graph comparing speed versus time for the Y-mirror drive cycle of FIG. 11A.

The holding period interval and acceleration period interval depicted in FIGS. 11A, 11B are shown for the drive-unassisted flyback embodiment (FIG. 10A). The invention is equally applicable for a drive-assisted flyback embodiment (FIG. 10B).

The holding period interval during which the Y-mirror 68 is steady is useful for many purposes. The holding period interval may have an adjustable time duration. The total duration of the Y-mirror drive cycle, that is, the total durations of the return scan, the holding period interval, the acceleration period interval, and the forward scan, can be made to exactly equal the frame rate of the incoming video signal. The holding period interval can also be conveniently used for calibrating the lasers, or for collecting feedback on the deviation of the Y-mirror from its ideal speed profile and for taking corrective action.

It will be understood that each of the elements described above, or two or more together, also may find a useful application in other types of constructions differing from the types described above.

While the invention has been illustrated and described as embodied in an arrangement for, and a method of, enhancing image projection, especially for use in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for enhancing image projection, comprising:
    a light source for generating a light beam;
    a mirror assembly, including a scan mirror, for reflecting the light beam as a pattern of scan lines on a projection surface, each scan line having a number of pixels;
    a controller for causing selected pixels in the scan lines to be illuminated, and rendered visible, by the light beam to form an image on the projection surface during a forward scan of the pattern, and for non-illuminating the pixels in the scan lines during a return scan of the pattern; and
    a drive for moving the scan mirror during the forward scan, for holding the scan mirror stationary during a holding period interval intermediate the forward scan and the return scan, and for driving the scan mirror during the return scan with a first drive pulse of one polarity during a first return interval of the return scan, and with a second drive pulse of opposite polarity during a subsequent, second return interval of the return scan.

2. The arrangement of claim 1, wherein the light source is a laser for emitting a laser beam as the light beam.

3. The arrangement of claim 1, wherein the light source includes a plurality of lasers for respectively generating a plurality of laser beams of different wavelengths, and an optical assembly for focusing and nearly collinearly arranging the laser beams to form the laser beams as a composite beam which is directed to the mirror assembly.

4. The arrangement of claim 3, wherein the lasers include red and blue, semiconductor lasers for respectively generating red and blue laser beams.

5. The arrangement of claim 4, wherein the lasers include a diode-pumped YAG laser and an optical frequency doubler for producing a green laser beam.

6. The arrangement of claim 1, wherein the scan mirror is operative for reflecting the light beam along a first direction at a first scan rate and over a first scan angle, and wherein the mirror assembly includes another scan mirror for reflecting the light beam along a second direction perpendicular to the first direction, and at a second scan rate different from the first scan rate, and at a second scan angle different from the first scan angle.

7. The arrangement of claim 6, wherein the scan mirrors are oscillatable about respective axes that are mutually orthogonal.

8. The arrangement of claim 1, and a support for supporting the light source, the mirror assembly and the drive.

9. The arrangement of claim 1, wherein the controller includes means for energizing the light source to illuminate the selected pixels, and for deenergizing the light source to non-illuminate pixels other than the selected pixels.

10. The arrangement of claim 1, wherein the drive is operative for moving the scan mirror in one circumferential direction about an axis at a constant drive speed during the forward scan.

11. The arrangement of claim 10, wherein the scan mirror is driven in an opposite circumferential direction about the axis during the return scan.

12. The arrangement of claim 10, wherein the drive is operative for driving the scan mirror at a zero drive speed during the holding period interval, and for driving the scan mirror with an acceleration pulse during an acceleration period interval between the forward scan and the return scan to move the scan mirror from the zero drive speed to the constant drive speed.

13. A module for enhancing image projection, comprising:
- a support;
- a light source on the support for generating a light beam;
- a mirror assembly, including a scan mirror on the support, for reflecting the light beam as a pattern of scan lines on a projection surface, each scan line having a number of pixels;
- a controller for causing selected pixels in the scan lines to be illuminated, and rendered visible, by the light beam to form an image on the projection surface during a forward scan of the pattern, and for non-illuminating the pixels in the scan lines during a return scan of the pattern; and
- a drive on the support for moving the scan mirror during the forward scan, for holding the scan mirror stationary during a holding period interval intermediate the forward scan and the return scan, and for driving the scan mirror during the return scan with a first drive pulse of one polarity during a first return interval of the return scan, and with a second drive pulse of opposite polarity during a subsequent, second return interval of the return scan.

14. An arrangement for enhancing image projection, comprising:
- means for generating a light beam;
- means including a scan mirror for reflecting the light beam as a pattern of scan lines on a projection surface, each scan line having a number of pixels;
- controller means for causing selected pixels in the scan lines to be illuminated, and rendered visible, by the light beam to form an image on the projection surface during a forward scan of the pattern, and for non-illuminating the pixels in the scan lines during a return scan of the pattern; and
- drive means for moving the scan mirror during the forward scan, for holding the scan mirror stationary during a holding period interval intermediate the forward scan and the return scan, and for driving the scan mirror during the return scan with a first drive pulse of one polarity during a first return interval of the return scan, and with a second drive pulse of opposite polarity during a subsequent, second return interval of the return scan.

15. A method of enhancing image projection, comprising the steps of:
- generating a light beam;
- reflecting the light beam as a pattern of scan lines on a projection surface, each scan line having a number of pixels, the reflecting step being performed at least in part by a scan mirror;
- causing selected pixels in the scan lines to be illuminated, and rendered visible, by the light beam to form an image on the projection surface during a forward scan of the pattern, and non-illuminating the pixels in the scan lines during a return scan of the pattern; and
- moving the scan mirror during the forward scan, holding the scan mirror stationary during a holding period interval intermediate the forward scan and the return scan, and driving the scan mirror during the return scan with a first drive pulse of one polarity during a first return interval of the return scan, and with a second drive pulse of opposite polarity during a subsequent, second return interval of the return scan.

16. The method of claim 15, wherein the light beam is a laser beam.

17. The method of claim 15, wherein the light beam is a composite laser beam formed by a plurality of laser beams of different wavelengths, and the step of focusing and nearly collinearly arranging the laser beams to form the composite beam.

18. The method of claim 17, wherein the laser beams include red, blue and green beams.

19. The method of claim 15, wherein the reflecting step is performed by initially reflecting the light beam along a first direction at a first scan rate and over a first scan angle, and by subsequently reflecting the light beam along a second direction perpendicular to the first direction, and at a second scan rate different from the first scan rate, and at a second scan angle different from the first scan angle.

20. The method of claim 15, wherein the controlling step is performed by energizing a light source to illuminate the selected pixels, and by deenergizing the light source to non-illuminate pixels other than the selected pixels.

21. The method of claim 15, wherein the moving step is performed by moving the scan mirror in one circumferential direction about an axis at a constant drive speed during the forward scan.

22. The method of claim 21, and the step of driving the scan mirror in an opposite circumferential direction about the axis during the return scan.

23. The method of claim 21, wherein the holding step is performed by driving the scan mirror at a zero drive speed during the holding period interval, and the step of driving the scan mirror with an acceleration pulse during an acceleration period interval between the forward scan and the return scan to move the scan mirror from the zero drive speed to the constant drive speed.

24. The arrangement of claim 1, wherein the holding period interval is adjustable.

25. The method of claim 15, and adjusting the holding period interval.

* * * * *